June 15, 1926.  1,588,740
H. A. JOHNSON
ADJUSTABLE BODY FOR AUTOMOBILES
Filed March 29, 1924     2 Sheets-Sheet 1
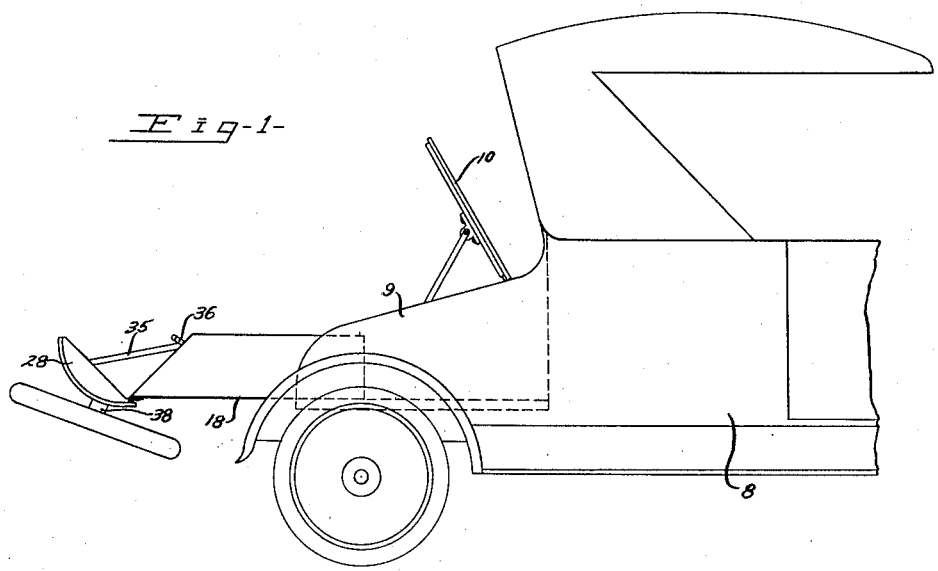
Fig-1-
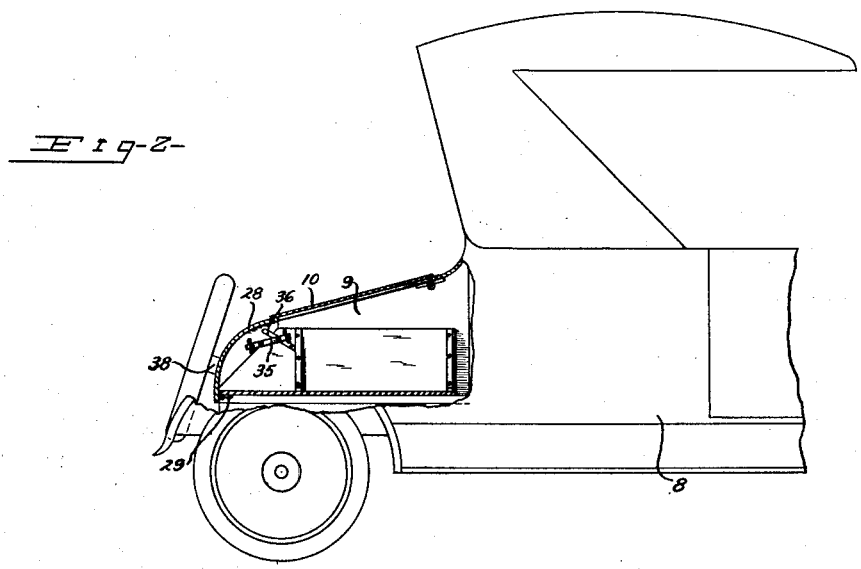
Fig-2-
INVENTOR.
Harry A. Johnson.
BY
Morsell, Keeney and Morsell
ATTORNEYS.

June 15, 1926. 1,588,740
H. A. JOHNSON
ADJUSTABLE BODY FOR AUTOMOBILES
Filed March 29, 1924    2 Sheets-Sheet 2
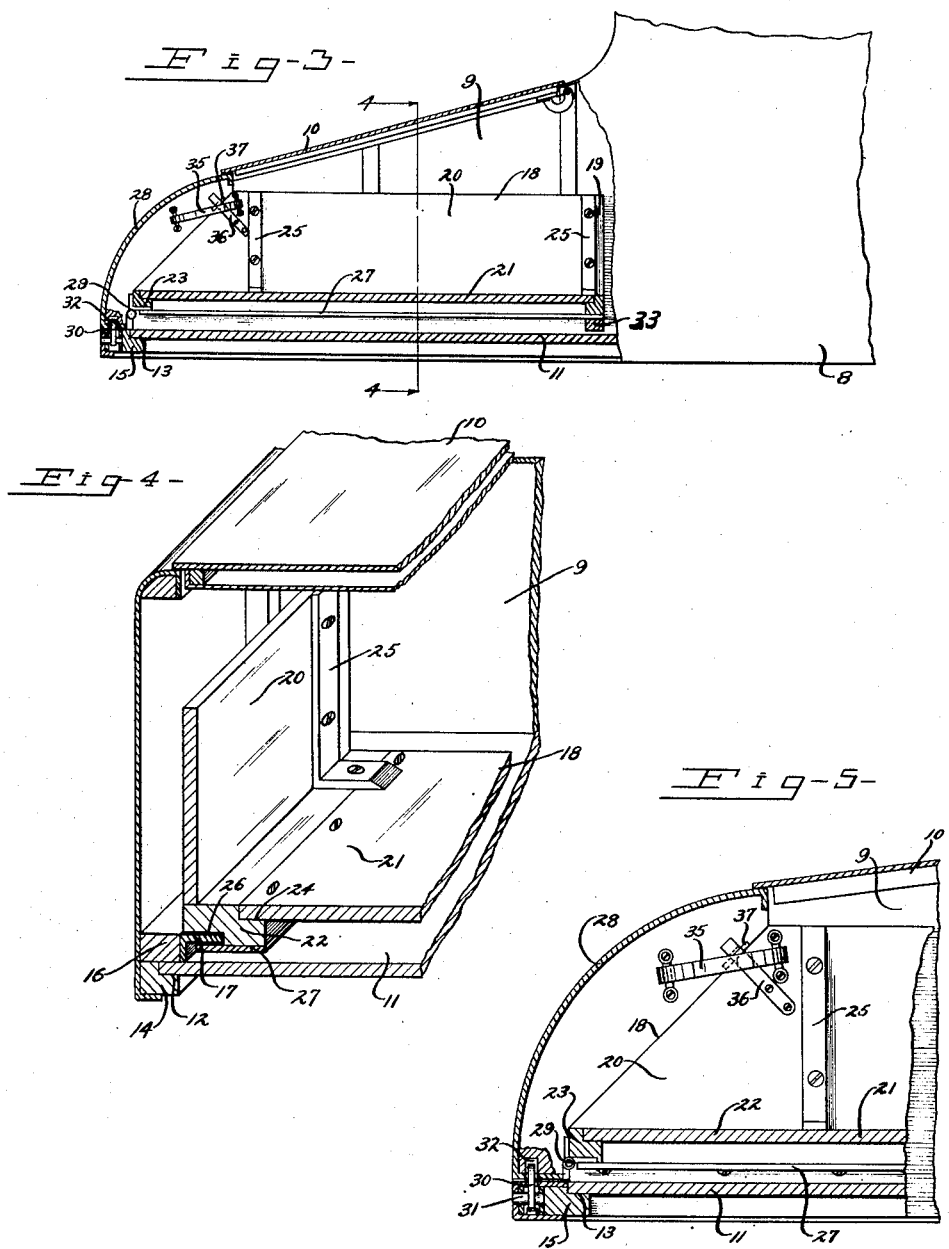
INVENTOR.
Harry A. Johnson
BY
ATTORNEYS.

Patented June 15, 1926.

1,588,740

UNITED STATES PATENT OFFICE.

HARRY A. JOHNSON, OF MILWAUKEE, WISCONSIN, ASSIGNOR TO CHARLES ABRESCH COMPANY, OF MILWAUKEE, WISCONSIN, A CORPORATION OF WISCONSIN.

ADJUSTABLE BODY FOR AUTOMOBILES.

Application filed March 29, 1924. Serial No. 702,839.

This invention relates to improvements in adjustable or auxiliary boxes for automobiles.

It is one of the objects of the present invention to provide an adjustable auxiliary box for automobiles of the "roadster" and "coupé" type to adapt them for use for delivery purposes.

A further object of the invention is to provide an adjustable box for coupés and roadsters, the box being concealed and out of the way when not in use, and adjustable to an extended position when it is desired to use the same.

A further object of the invention is to provide an auxiliary delivery box for roadsters and coupés of any make with which the automobile may be easily equipped without any material alteration thereof.

A further object of the invention is to provide a device of the class described which will allow the use of the vehicle luggage compartment at all times.

A further object of the invention is to provide an auxiliary box of the class described which is provided with a spare tire carrier, the same being conveniently positioned for use when the box is in either position of adjustment.

A further object of the invention is to provide an auxiliary delivery box for automobiles which is of very simple construction, is inexpensive to manufacture, is strong and durable, and is well adapted for the purposes described.

With the above and other objects in view the invention consists of the improved adjustable body or box for automobiles and its parts and combinations as set forth in the claim, and all equivalents thereof.

In the accompanying drawings in which the same reference characters indicate the same parts in all of the views:—

Fig. 1 is a fragmentary view of the rear portion of an automobile equipped with the improved adjustable body or box, the same being shown in extended position;

Fig. 2 is a view similar to Fig. 1 only showing the box in unextended position, parts being broken away and shown in section;

Fig. 3 is an enlarged fragmentary view of the luggage compartment of an automobile provided with the adjustable box or body in unextended position, parts being broken away and shown in section;

Fig. 4 is a transverse perspective sectional view taken on a larger scale on the line 4—4 of Fig. 3; and Fig. 5 is an enlarged fragmentary sectional view of the rear end of a vehicle luggage compartment fitted with the improved adjustable box.

Referring now more particularly to the drawing it will be seen that the numeral 8 indicates an automobile of the "roadster" or "coupé" type having a rear luggage compartment 9 provided with the usual hinged door 10. The bottom 11 of the luggage compartment is seated in edge recesses 12 and 13 formed in side and end frame members 14 and 15 respectively, permitting the bottom to be flushed with the upper surfaces thereof. Additional longitudinal frame members 16 are secured to the upper surfaces of the members 14 and their inner faces have longitudinally extending angle iron members 17 attached thereto forming tracks for the adjustable box to slide on, as will be hereinafter explained.

The numeral 18 represents an adjustable body or auxiliary delivery box and the same is normally located within the luggage compartment 9. The box consists essentially of an inner end member 19, sides 20, and a bottom 21. Side and end rail or frame members 22 and 23 are further provided for securing together the box sides and bottom. Said side rail members are recessed as at 24 to receive the side edge portions of the bottom 21 and the sides 20 are secured to the members 22 by metallic braces 25. The lower and outer edge portions of the members 22 are provided with longitudinally extending recesses 26 and flat metallic plate members 27 are secured to the underside of the members 22 so as to partially overlap the recesses 26, as shown in Fig. 4. As is apparent from the drawing, the box 18 is slidably mounted within the compartment 9. The angle iron members 17, fitting within the recesses 26, form tracks for the box to move on and the overlapping plates 27 will strike against the lower faces of said angle iron members to prevent vertical movement of the box.

A curved door 28, hinged as at 29 to the box member, normally closes the rear end of the luggage compartment and gives it a finished appearance. A pawl 30, operated by means of a key insertable in the aperture 31, normally engages a slot 32 in the door 28 and locks the same in closed position to prevent the extension of the box. However, when a key is turned to disengage said pawl, the door 28 may be dropped and the box extended to the position shown in Fig. 1, for use. A block or shoulder 33, secured to the underside of the box, will strike against the pawl to prevent the complete withdrawal of the box. Straps 35, attached to the door 28 and the end portions of the box hold the door in the open position shown in Fig. 1. When said door is closed, the straps will fold as shown in Fig. 5. A spring catch 36, secured to the side of the box, will engage a lug 37 formed in the side of the door 28 and assist in disengageably holding the door in closed position.

It should be observed that a spare tire carrier or rack 38 is secured to the rear door 28, as shown. When the auxiliary box is unextended, the rack 38 will assume the position shown in Fig. 2, while when the box is extended and the door 28 is dropped, the rack 38 is positioned as shown in Fig. 1.

From the foregoing description it will be seen that the improved auxiliary delivery box for automobiles is of very simple and novel construction, and is well adapted for the purpose set forth.

What I claim as my invention is:—

The combination with a motor vehicle having a luggage compartment in the rear thereof, and longitudinal rail members within said compartment, of a box member normally held within said compartment and slidably movable on said rails to a position projecting from the compartment for use, said box member having complementary rail members formed with extending portions to engage the compartment rails and prevent vertical displacement of the box member, a door hinged to the rear of the box member and normally closing the rear of the luggage compartment, a key actuated pawl extending from the floor of the compartment and releasably engaging the door to hold the box member in position within the compartment, and a catch extending from the box member and engaging the door to releasably hold the same in closed position.

In testimony whereof, I affix my signature.

HARRY A. JOHNSON.